(12) United States Patent
Jacobsen et al.

(10) Patent No.: US 9,227,157 B2
(45) Date of Patent: Jan. 5, 2016

(54) SPRAY DRYER ABSORPTION APPARATUS WITH FLAT-BOTTOMED CHAMBER

(75) Inventors: Niels Jacobsen, Gentofte (DK); Christian Holm Fridberg, Herlev (DK); Bjarne Rasmussen, Copenhagen Ø (DK); Anna Vibeke Rasmussen, legal representative, Silkeborg (DE)

(73) Assignee: GEA Process Engineering A/S, Soborg (DK)

( * ) Notice: Subject to any disclaimer, the term of this patent is extended or adjusted under 35 U.S.C. 154(b) by 446 days.

(21) Appl. No.: 13/809,821

(22) PCT Filed: Jul. 12, 2010

(86) PCT No.: PCT/DK2010/050184
§ 371 (c)(1),
(2), (4) Date: Apr. 30, 2013

(87) PCT Pub. No.: WO2012/006996
PCT Pub. Date: Jan. 19, 2012

(65) Prior Publication Data
US 2013/0302229 A1    Nov. 14, 2013

(51) Int. Cl.
*B01D 53/40* (2006.01)
*B01D 53/80* (2006.01)
*B01D 53/50* (2006.01)
*F23J 15/04* (2006.01)

(52) U.S. Cl.
CPC ............... *B01D 53/80* (2013.01); *B01D 53/40* (2013.01); *B01D 53/504* (2013.01); *F23J 15/04* (2013.01); *B01D 53/505* (2013.01); *B01D 2257/302* (2013.01); *F23J 2219/40* (2013.01); *F23J 2219/50* (2013.01)

(58) Field of Classification Search
CPC .... B01D 53/504; B01D 53/505; B01D 53/80; B01D 53/40; B01D 2257/302; F23J 15/04; F23J 2219/40; F23J 2257/302
USPC ........................................ 96/301, 321; 95/219
See application file for complete search history.

(56) References Cited

U.S. PATENT DOCUMENTS

| 6,060,030 A * | 5/2000 | Schwab et al. ................. 423/210 |
| 8,741,035 B2 * | 6/2014 | Jacobsen et al. ................. 96/301 |
| 2006/0060088 A1 * | 3/2006 | Maryamchik et al. .......... 96/355 |
| 2013/0156665 A1 * | 6/2013 | Jankura et al. ................. 423/210 |

* cited by examiner

*Primary Examiner* — Timothy Vanoy
(74) *Attorney, Agent, or Firm* — Sughrue Mion, PLLC

(57) ABSTRACT

In the application a spray dryer absorption apparatus for treating a stream of flue gas containing acidic components is disclosed. The apparatus comprises a chamber having vertical cylindrical walls, said chamber comprises (i) an inlet for a flue gas stream containing an acidic component, (ii) an atomizer for spraying droplets of an absorbent slurry into said flue gas stream to effect a chemical reaction between the droplets and the acidic component of the flue gas, thereby forming a particulate reaction product, and (iii) an outlet for the treated flue gas and entrained particulate reaction product, wherein the bottom of the chamber having vertical cylindrical walls is substantially horizontal and impervious to gases. The apparatus of the invention has the advantage of a simplified geometry accounting for lower building and maintenance costs.

18 Claims, 3 Drawing Sheets

SPRAY DRYER ABSORPTION APPARATUS WITH FLAT-BOTTOMED CHAMBER

CROSS REFERENCE TO RELATED APPLICATIONS

Figure 1:
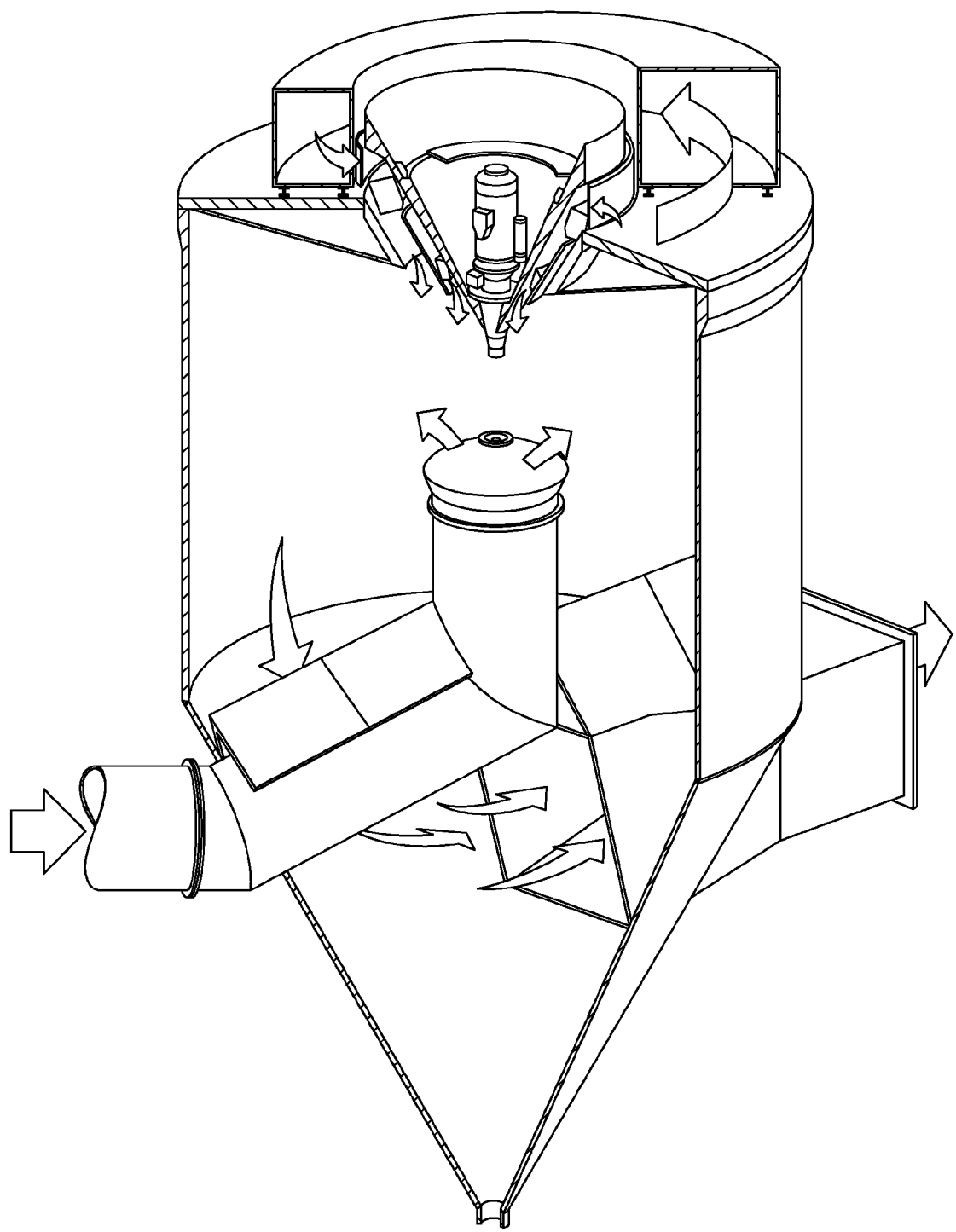

This application is a National Stage of International Application No. PCT/DK2010/050184 filed Jul. 12, 2010, the contents of all of which are incorporated herein by reference in their entirety.

The present invention relates to a spray dryer absorption apparatus for treating a stream of flue gas containing acidic components as well as a method for treating such stream of flue gas.

BACKGROUND FOR THE INVENTION

Combustion plants emit large amount of flue gas containing fly ash and harmful, acidic gasses, such as $SO_2$. Therefore, to avoid undesired impact on the environment, combustion plants usually have installed flue gas desulfurization systems to reduce $SO_2$ emission.

A particular attractive way of removing acidic components from a flue gas is provided by a spray dryer absorber (SDA). In an SDA acidic gasses are absorbed in an absorbent sprayed into the flue gas. Typically, the flue gas is introduced into a spray dryer absorption chamber and contacted with a fine spray of absorbent slurry, such as an aqueous suspension of burned lime. A significant part of the acidic components in the flue gas are rapidly absorbed into the alkaline droplets and water is evaporated simultaneously. The gas distribution, slurry flow rate and droplet size are controlled such that the droplets are dried to a fine powder.

The conventional design of the SDA chamber includes an upper cylindrical part combined with a lower cone part. Examples of this design are shown in U.S. Pat. No. 4,279,873 (Niro) and U.S. Pat. No. 4,530,822. The intended function of the cone part was to collect the heavy particles that dropped out of the flue gas stream and to secure a volume for deposits to fall into in case of malfunction, thereby securing a clean gas path through the system.

The present inventors have now realized that a clean gas path could be realized by an alternative design of the SDA chamber saving significant investment in materials. Moreover, the frequent maintenance of the product discharge system in the SDA cone may be dispensed with. It is therefore the aim of the present invention to substantially reduce the construction and maintenance costs of an SDA plant. Lower cost of the SDA system may prompt areas rich in coal of a poor quality to control the air pollution by using a SDA system for treating the flue gas.

SUMMARY OF THE INVENTION

The present invention relates to a spray dryer absorption apparatus for treating a stream of flue gas containing acidic components, comprising
 a chamber having vertical cylindrical walls, said chamber comprises
  an inlet for a flue gas stream containing an acidic component,
  an atomizer for spraying droplets of an absorbent slurry into said flue gas stream to effect a chemical reaction between the droplets and the acidic component of the flue gas, thereby forming a particulate reaction product, and
  an outlet for the treated flue gas and entrained particulate reaction product,
 wherein the bottom of the chamber having vertical cylindrical walls is substantially horizontal and impervious to gases.

Compared to the traditional design of a chamber for a spray dryer absorption apparatus calculations have shown that the present invention affords savings of 20% or more in the consumption of materials. The largest saving is localized to the fact that supporting structures are substantially reduced. The simplified geometry also allows for a lesser building height. In some embodiments the building height is reduced with about ⅓ compared to the conventional construction. At the same time, the design ensures that the smaller particles are transferred from the SDA to the filter while occasionally lumps are accepted to be withhold in the bottom of the SDA chamber.

The outlet of the chamber may be positioned in various heights in the vertical direction of the wall. The lower part of the outlet duct should however not be positioned higher than 50% of the distance from the ground level. It is preferred, however, to position the lower part of the outlet at a lower level, i.e. between 3 and 40% above the ground level to avoid interference with the zone where the droplets and the acidic components are mixed and reacted. It is generally preferred that the lowest part of the outlet for the treated flue gas is positioned at a distance from the bottom of at least 3% of the height of the cylindrical chamber walls. In typical constructions the lowest part of the outlet duct is positioned 0.5 m or higher, such as 1 m or higher above the bottom level. Usually the lowest part of the outlet duct is not positioned 2.5 m or higher above the bottom level. If the outlet is positioned too low, a risk may exist that the small amount of lumps withheld in the bottom may partly occlude the entrance of the outlet. Optimal position of the outlet will result in an initial build-up of deposits. After the initial phase, a steady-state is reached in which the amount of deposited particulate matter is in equilibrium with particles entrained by the flue gas.

The geometry of the outlet may be designed in accordance with the needs. Thus the outlet may be of a circular form matching a cylindrical duct or a polygon. The polygon may have any number of sides possible, such as 3, 4, 5, 6, 7, 8, or 12. In a certain aspect of the invention the outlet for the treated flue gas is rectangular.

The relationship between the breadth and the height of the rectangle may in the range of 5:1 to 1:5. I a certain embodiment, the breadth is larger than the height, e.g. the breadth may be 1.1 to 5 times larger than the height.

Deposits of the particulate reaction product may adhere to any part of the interior of the chamber. Deposits adhering to the vertical cylindrical walls may loosen and fall down after a period of operation of the apparatus. Therefore, is a preferred embodiment, to maintain an unrestricted flow of treated flue gas out of the chamber, the outlet for the treated flue gas at the internal face of the vertical cylindrical walls above the upmost part comprises a hat preventing particulate reaction product sliding down the walls from occluding the outlet.

Before the treated flue gas can be liberated to the environment or is treated further, it is generally cleaned by removing the entrained particulate reaction product. To obtain the cleaning, the outlet via a duct may be connected to a filter for removal of the particulate reaction product from the treated flue gas stream. The method of filtering may be chosen according to the needs. In a presently preferred aspect of the invention the treated flue gas is filtered in a bag-filter. Alternatively, treated flue gas is filtered through an electro-filter or a cyclone. The various filtering methods may be used in succession, e.g. a bag-filter may be used after a cyclone treatment of the flue gas.

The apparatus of the invention requires at least one outlet for the treated flue gas. In certain embodiments two or more outlets for the treated flue gas is arranged in the chamber. More than one outlet may be advantageous for improving the flow pattern for the flue gas in the chamber. It is generally desired not to have larger areas in the lower part of the chamber with too low gas velocity, such as below 0.5-5 m/s dependent on the characteristics of the particulate reaction product. Two or more outlets may be convenient, e.g. if using more filter units. The two or more outlets are generally equally displaced along the perimeter of the chamber but may also be arranged otherwise on the perimeter or may be placed above each other.

The spray dryer absorption apparatus of the invention may operate in single mode or multiple apparatuses may operate in parallel. Multiple spray dryer absorption apparatuses may be used to achieve the needed capacity or to have redundancy. In a preferred aspect of the invention, the diameter of the vertical cylindrical chamber is between 10 m and 25 m. A chamber of this dimension may be used in both single mode and parallel mode. The height of the vertical chamber wall may e.g. be between 8 m and 30 m.

The apparatus of the present invention requires at least one inlet for the flue gas to be treated. To obtain a sufficient capacity in larger apparatuses is may be advantageously to install two or more inlets in the chamber. When two or more inlets are used they may be arranged in the chamber such that a thorough mixing is obtained, e.g. be delivering the flue gas below as well as above the atomized droplets of absorbent material.

The apparatus may be produced entirely in metal, usually steel. However, to obtain an economical version of the apparatus only the parts above ground level is in metal while the bottom is prepared of concrete. Thus, in a typical aspect of the invention, the bottom is prepared of concrete and the cylindrical walls of the chamber is prepared of metal, said metal cylindrical walls being mounted to the concrete bottom.

In a preferred aspect of the invention, the outlet is not positioned in the bottom of the chamber. Rather, the outlet is positioned in the vertical walls.

In a further embodiment of the invention the bottom as well as at least a part of the vertical cylindrical walls is prepared of concrete. The apparatus of the invention may be provided with means for cleaning the bottom for settled material. In general, it is not preferred to provide the chamber with integrated means for removing settled particulate reaction product. Rather, it is preferred to allow the particulate reaction product to deposit initially. After a period of operation the particles are deposited in areas of the chamber having low flowing velocity. By proper construction of the apparatus a steady-state will be obtained in which the amount of deposited material is in equilibrium with the entrained amount of particulate material.

For maintenance purposes and for occasional removal of the deposit in the chamber, the vertical cylindrical walls of the chamber at the lower part thereof may be provided with a closable entrance of a size sufficient for a digging vehicle to pass. Thus, the entrance opening may be about 2-3 m in height and 1.5 to 2.5 m wide.

The present invention also relates to a method for treating a stream of flue gas containing acidic components, comprising the steps of:

Entering a stream of flue gas containing an acidic component into a chamber of a spray dryer absorption apparatus, said chamber having vertical cylindrical walls, Atomizing an absorbent slurry into said flue gas stream to effect a chemical reaction between the droplets and the acidic component of the flue gas, thereby forming a particulate reaction product, and Directing the stream of treated flue gas and entrained particulate reaction product out of the chamber for further processing in a filter, wherein the bottom of the chamber having vertical cylindrical walls is substantially horizontal and impervious to gases.

According to the method an initial build-up of deposits are accepted. After a certain period of time the particulate reaction product has settled in areas of the bottom at which the gas flow velocity is too low for entraining the larger particles to be suspended in the treated flue gas. The settled particles form during use of the apparatus an internal landscape of deposit. The landscape is dynamic, i.e. self-adjusting and may be changed in response to an altered flow pattern. The formation of sediments in the bottom area with a low gas velocity entails that the areas with high flow velocities in the bottom section are increased. The apparatus may be constructed so that certain gas velocities are achieved in the lower part of the chamber.

The accumulation is continued until a steady-state is established, i.e. a situation in which the amount of deposited particulate reaction product is in equilibrium with the amount of particulate material that is suspended in the gas. When the steady-state is reached essentially the entire amount of particulate reaction product is conveyed from the chamber to the further treatment in e.g. a filter device.

BRIEF DISCLOSURE OF THE FIGURES

Figure 2:
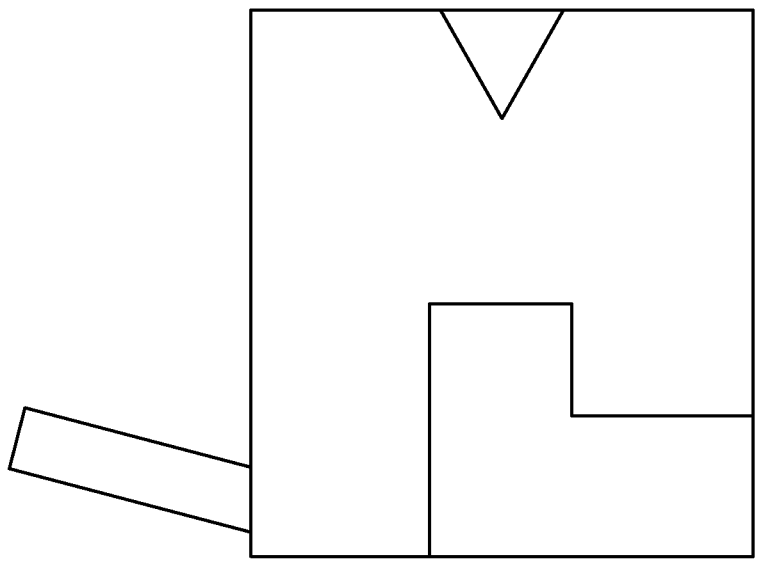
Figure 3:
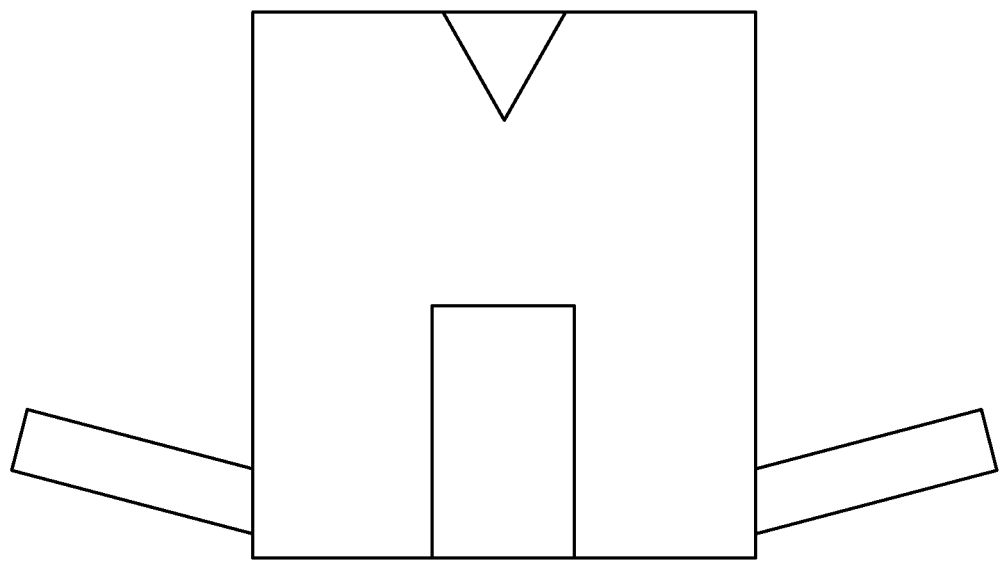
Figure 4:
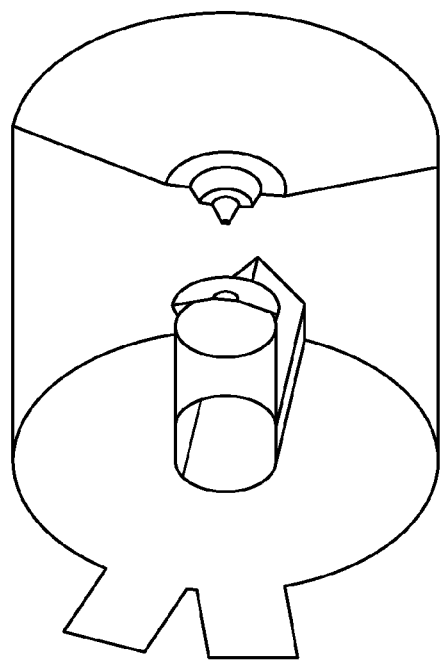
Figure 5:
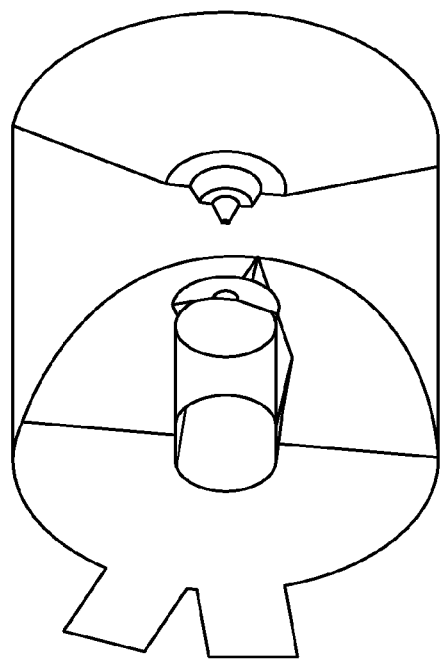

FIG. 1 shows a prior art SDA apparatus.
FIG. 2 shows an embodiment with two inlets and a single outlet.
FIG. 3 shows an embodiment with 2 square outlets spaced 180 degrees apart.
FIG. 4 shows the flow pattern in an embodiment having two neighboring rectangular outlets.
FIG. 5 shows the flow pattern in an embodiment having two neighboring rectangular outlets in which particulate material has been deposited.

DETAILED DISCLOSURE OF THE INVENTION

The avoidance of harmful emissions from power plants and waste incinerators has high priority in the political debate. The present invention offers an option for lowering the costs for plants producing high amounts of particles from combustion of fossil fuels, including coal. The invention may also be used in relating to incineration of waste, or other processes generating industrial off-gases. Such off-gases may originate from e.g. metal sinter plants, smelter plants, coke-ovens, glass factories, carbon black plants, etc.

Coal exists in various forms and any of these can be used for providing the flue gas used in the method of the present invention. The term coal, as used herein, covers peat, lignite (also referred to as brown coal), sub-bituminous coal, bituminous coal, anthracite, and graphite.

FIG. 1 discloses an example of a spray drying absorption apparatus according to the prior art. Flue gas containing acidic gases, such as $SO_2$, enters the chamber at the arrow to the left and at the scroll positioned at the top of the chamber. In the center of the top section of the chamber an atomizer is arranged. The atomizer sprays absorbent slurry into the flue gas to be treated. The droplets and the acidic components of the flue gas are mixed and reacted in the zone shown as a mist. Simultaneously with the reaction, the solvent of the droplets are evaporated, resulting in the formation of a solid particulate reaction product. Part of the particulate reaction product is entrained by the treated flue gas stream and is carried out of the chamber through the outlet shown to the right. Another part of the particulate reaction product is deposited in the cone part of the chamber. The deposited material may continuously or intermittently be recovered from the chamber through the apex of the cone.

FIG. 2 shows schematically the cross-section of the interior of an embodiment of the apparatus according to the invention. The chamber is essentially a vertical cylinder with a flat bottom and a slightly indented ceiling. The flue gas enters the chamber at two points. The first entrance point is shown as a triangle in the ceiling at which an annular flue gas stream opening is provided. In the opening not shown guiding vanes are positioned to disperse the gas flue gas in the chamber. The second entrance point is a disperser ejecting gas upwards in the chamber. The disperser comprises guiding vanes for dispersing the flue gas in the chamber.

At the center of the ceiling an atomizer is provided. The atomizer may be a nozzle or a rotary atomizer, preferably the latter due to capacity and wear. There may be used more than one rotary atomizer such as e.g. three or four in one SDA chamber. Similar, multiple nozzles may be used in larger plants. The atomizer sprays absorbent slurry capable of reacting with the acidic components of the flue gas. The main acidic component in the flue gas is $SO_2$, however other acidic gases may be present. The absorbent slurry is predominately slaked lime but may be any absorbent capable of reaction with the acidic component. In the zone where the droplets and the flue gas is mixed a simultaneous reaction and drying is obtained. The particulate reaction product comprises various calcium sulfite salts commingled with varying amounts of fly ash and unspent lime. The particulate reaction product may be entrained by the flue gas or deposited depending on the local gas velocities. As a rule of thumb the majority of the particulate reaction product may be assumed to be suspended in the flue gas. Deposits on the interior faces of the chamber may form lumps which may settle on the bottom. The treated flue gas containing entrained particulate reaction product is leaving the chamber though an outlet shown to the left of the drawing. The outlet is connected to a duct. Above the outlet at the interior face of the vertical cylindrical walls of the chamber a hat may be positioned. The hat secures that deposits sliding down the vertical walls above the outlet do not occlude or impede the outlet. The hat is generally of a triangular shape to allow the deposit to fall to the bottom on both sides of the outlet.

FIG. 3 shows an embodiment with two outlets positioned 180 degrees apart.

Initially performed CFD simulations of traditionally constructed SDA chambers have shown that the velocities in the lower part of the cone are quite low and that this part of the chamber is not significant in the drying and absorption process. The lower part of the cone may therefore be superfluous.

Based on field observations, an approximate cut-velocity for determining the deposit-line was defined. This cut-velocity was used to define the deposits in 2 CFD simulations of various designs of a flat bottomed SDA chamber design. The bottom of outlet duct was in the simulations located approximately 1.2 m above the flat bottom.

The 2 simulations investigate the following scenarios:

2 rectangular outlet ducts H:B=1:2 positioned close to each other (FIG. 4).

2 rectangular outlet duct H:B=1:2 positioned close to each other with accumulation of deposits forming a landscape in the bottom of the chamber (FIG. 5).

All simulations show that the velocity at the outlet and in most of the lower volume in the flat bottomed design is significantly higher than the predefined cut-velocity, i.e. only an insignificant amount of buildup of particulate matter in the bottom is expected.

The incident in which the bottom retained large amounts of deposit build-up (FIG. 5) shows, when compared to FIG. 4, that the general velocity level close to this deposit level is increased. In the bottom area relatively high velocities compared to the chosen cut-velocity are expected. In a steady-state mode, the chamber will to a large extend be self-cleaning and self-regulating. It is believed that the amount of deposits will be reasonable and deposited at the area around the inlet duct and near the cylinder wall as velocities will be naturally low here. Close to the outlet the velocities are quite high and the risk of accumulation of particulate matter and deposits are assumed to be low.

The spray drying absorption process is expected to be unaffected by the flat-bottom design since the reaction between the acidic component and the absorbent as well as the simultaneous drying take place mainly in the upper part of the cylinder.

The invention claimed is:

1. A spray dryer absorption apparatus for treating a stream of flue gas containing acidic components, comprising
    a chamber having vertical cylindrical walls, said chamber comprises
    an inlet for a flue gas stream containing an acidic component,
    an atomizer for spraying droplets of an absorbent slurry into said flue gas stream to effect a chemical reaction between the droplets and the acidic component of the flue gas, thereby forming a particulate reaction product, and
    an outlet for the treated flue gas and entrained particulate reaction product,
    wherein
    the bottom of the chamber having vertical cylindrical walls is substantially horizontal and impervious to gases, and
    the outlet for the treated flue gas is rectangular having a breadth 1.1 to 5 times larger than the height.

2. The spray dryer absorption apparatus according to claim 1, wherein the lowest part of the outlet for the treated flue gas is positioned at a distance from the bottom of at least 3% of the height of the cylindrical chamber walls.

3. The spray dryer absorption apparatus according to claim 1, wherein the outlet for the treated flue gas at the internal face of the vertical cylindrical walls above the upmost part comprises a hat preventing particulate reaction product sliding down the walls from occluding the outlet.

4. The spray dryer absorption apparatus according to claim 1, wherein the outlet via a duct is connected to a filter for removal of the particulate reaction product from the treated flue gas stream.

5. The spray dryer absorption apparatus according to claim 1, wherein two or more outlets for the treated flue gas is arranged in the chamber.

6. The spray dryer absorption apparatus according to claim 1, wherein the diameter of the vertical cylindrical chamber is between 10 m and 25 m.

7. The spray dryer absorption apparatus according to claim 1, wherein the bottom is prepared of concrete and the cylindrical walls of the chamber is prepared of metal, said metal cylindrical walls being mounted to the concrete bottom.

8. The spray dryer absorption apparatus according to claim 1, wherein the chamber is not provided with integrated means for removing settled particulate reaction product.

9. The spray dryer absorption apparatus according to claim 1, wherein the bottom of the chamber has no outlet.

10. The spray dryer absorption apparatus according to claim 1, wherein the vertical cylindrical walls of the chamber at the lower part thereof is provided with a closable entrance of a size sufficient for a digging vehicle to pass.

11. A method for treating a stream of flue gas containing acidic components, comprising the steps of:
 entering a stream of flue gas containing an acidic component into a chamber of a spray dryer absorption apparatus, said chamber having vertical cylindrical walls,
 atomizing an absorbent slurry into said flue gas stream to effect a chemical reaction between the droplets and the acidic component of the flue gas, thereby forming a particulate reaction product, and
 directing the stream of treated flue gas and entrained particulate reaction product out of the chamber for further processing in a filter,
 wherein the bottom of the chamber having vertical cylindrical walls is substantially horizontal and impervious to gases, and
 the outlet for the treated flue gas is rectangular having a breadth 1.1 to 5 times larger than the height.

12. The method according to claim 11, wherein the gas velocity is 0.5-5 m/s in the lower part of the chamber.

13. The method according to claim 12, wherein particulate reaction product not entrained by the gas out of the chamber is accumulated in the chamber.

14. The method according to claim 13, wherein the accumulation is continued until a steady-state is established.

15. The method according to any of the claim 12, wherein the bottom of the chamber has no outlet.

16. The method according to any of the claim 12, wherein the flue gas stream originates from a plant combusting fossil fuel.

17. The method according to any of the claim 12, wherein the flue gas stream originates from an incineration plant.

18. The method according to claim 12, wherein the flue gas stream is an industrial off-gas.

\* \* \* \* \*